US00RE39166E

(19) United States
(12) Reissued Patent
Gammie

(10) Patent Number: US RE39,166 E
(45) Date of Reissued Patent: Jul. 11, 2006

(54) EXTERNAL SECURITY MODULE FOR A TELEVISION SIGNAL DECODER

(75) Inventor: Keith B. Gammie, Markham (CA)

(73) Assignee: Scientific-Atlanta, Inc., Lawrenceville, GA (US)

(21) Appl. No.: 08/056,795

(22) Filed: May 4, 1993

Related U.S. Patent Documents

Reissue of:
(64) Patent No.: 5,029,207
Issued: Jul. 2, 1991
Appl. No.: 07/473,442
Filed: Feb. 1, 1990

(51) Int. Cl.
*H04N 7/167* (2006.01)

(52) U.S. Cl. ..... 380/228; 380/239; 380/281
(58) Field of Classification Search ..... 380/239, 380/240, 241, 277, 278, 281, 228
See application file for complete search history.

(56) References Cited

U.S. PATENT DOCUMENTS

| | | | | |
|---|---|---|---|---|
| 2,656,408 | A | | 10/1953 | Gray et al. |
| 4,281,216 | A | * | 7/1981 | Hogg et al. |
| 4,317,957 | A | * | 3/1982 | Sendrow |
| 4,337,483 | A | * | 6/1982 | Guillou |

(Continued)

FOREIGN PATENT DOCUMENTS

| | | | |
|---|---|---|---|
| EP | 0 132 401 | | 1/1985 |
| EP | 0 308 219 | | 9/1988 |
| EP | 0308219 | * | 9/1988 |
| GB | 2 151 886 A | | 7/1985 |
| WO | WO 85/00491 | | 1/1985 |
| WO | WO 86/06240 | | 10/1986 |

OTHER PUBLICATIONS

A Method of Authentication in EFT Networks Using DES Without Downline Loading of Working Keys, by Marvin Sendrow, Trends and Applications, 5–80.*

(Continued)

*Primary Examiner*—Gilberto Barron, Jr.

(57) ABSTRACT

A decoder for descrambling encoded satellite transmissions comprises an internal security element and a replaceable security module. The program signal is scrambled with a key and then the key itself is twice-encrypted and multiplexed with the scrambled program signal. The key is first encrypted with a first secret serial number ($SSN_1$) which is assigned to a given replaceable security module. The key is then encrypted with a second secret serial number ($SSN_0$) which is assigned to a given decoder. The decoder performs a first key decryption using the second secret serial number ($SSN_0$) stored within the decoder. The partially decrypted key is then further decrypted by the replaceable security module using the first secret serial number ($SSN_1$) stored within the replaceable security module. The decoder then descrambles the program using the twice-decrypted key. The replaceable security module can be replaced, allowing the security system to be upgraded or changed following a system breach.

59 Claims, 9 Drawing Sheets

U.S. PATENT DOCUMENTS

| | | | | | |
|---|---|---|---|---|---|
| 4,377,483 | A | | 3/1983 | Yamashita et al. | 210/670 |
| 4,386,233 | A | * | 5/1983 | Smid et al. | 380/45 |
| 4,386,266 | A | * | 5/1983 | Chesarek | 380/45 |
| 4,388,643 | A | * | 6/1983 | Aminetzah | |
| 4,399,323 | A | * | 8/1983 | Henry | 380/45 |
| 4,484,025 | A | * | 11/1984 | Ostermann et al. | 380/23 |
| 4,484,027 | A | * | 11/1984 | Lee et al. | |
| 4,530,008 | A | * | 7/1985 | McVoy | 380/23 |
| 4,531,020 | A | * | 7/1985 | Wechselberger et al. | 380/23 |
| 4,531,021 | A | * | 7/1985 | Bluestein et al. | 380/23 |
| 4,535,355 | A | | 8/1985 | Arn et al. | |
| 4,558,175 | A | * | 12/1985 | Genest et al. | 380/23 |
| 4,595,950 | A | | 6/1986 | Lofberg | |
| 4,608,456 | A | * | 8/1986 | Paik et al. | |
| 4,613,901 | A | * | 9/1986 | Gilhousen et al. | |
| 4,634,808 | A | * | 1/1987 | Moerder | |
| 4,658,292 | A | * | 4/1987 | Okamoto et al. | 380/23 |
| 4,663,664 | A | | 5/1987 | Ragan et al. | 380/16 |
| 4,694,491 | A | | 9/1987 | Horne et al. | |
| 4,696,034 | A | * | 9/1987 | Wiedemer | 380/10 |
| 4,712,238 | A | * | 12/1987 | Gilhousen et al. | |
| 4,736,422 | A | | 4/1988 | Mason | |
| 4,757,532 | A | | 7/1988 | Gilham | |
| 4,785,166 | A | * | 11/1988 | Kushima | |
| 4,792,973 | A | | 12/1988 | Gilhousen et al. | 380/24 |
| 4,799,635 | A | | 1/1989 | Nakagawa | 364/900 |
| 4,802,214 | A | | 1/1989 | Barany | 380/15 |
| 4,802,215 | A | | 1/1989 | Mason | |
| 4,803,725 | A | | 2/1989 | Horne et al. | |
| 4,807,286 | A | | 2/1989 | Wiedemer | |
| 4,829,569 | A | * | 5/1989 | Seth-Smith et al. | 380/10 |
| 4,841,133 | A | * | 6/1989 | Gercekci et al. | |
| 4,849,927 | A | | 7/1989 | Vos | |
| 4,864,615 | A | | 9/1989 | Bennett et al. | 380/21 |
| 4,866,770 | A | * | 9/1989 | Seth-Smith et al. | 380/14 |
| 4,885,788 | A | * | 12/1989 | Takaragi et al. | 380/23 |
| 4,890,321 | A | | 12/1989 | Seth-Smith et al. | 380/20 |
| 4,897,875 | A | * | 1/1990 | Pollard et al. | 380/23 |
| 4,905,280 | A | * | 2/1990 | Wiedemer | |
| RE33,189 | E | * | 3/1990 | Lee et al. | |
| 4,907,271 | A | | 3/1990 | Gilham | |
| 4,907,273 | A | * | 3/1990 | Wiedemer | |
| 4,908,834 | A | * | 3/1990 | Wiedemer | |
| 4,926,444 | A | | 5/1990 | Hamilton et al. | |
| 4,933,898 | A | * | 6/1990 | Gilberg et al. | |
| 5,237,609 | A | | 8/1993 | Kimura | |

OTHER PUBLICATIONS

United States Advanced Televisioin Systems Committee Report, "Multiplexed Analog Component Television Broadcast System Parameter Specifications", published Apr. 18, 1987.*

Smart Card Conditional Access Microcomputers Memories, Motorola, 1988.*

"HDTV To Alter Cable Security Technology", Multichannel News, Sep. 25, '89.*

"A Method of Authentication in EFT Networks Using DES Without Downline Loading of Working Keys", Marvin Sendrow, Trends and Applications, 5–80.*

United Staes Advanced Television Systems Committee report, "Multiplexed Analog Television Broadcast System Parameter Specifications", published Apr. 18, 1987.*

"Smart Card Conditional Access Microcomputers Memories", Motorola, 1988.*

Proposal For New Part 6 Of The EBU Specification For The MAC/Packet Family, Version of 24, Published Oct. 1988.

Appendix 1 To Proposed New Part 6: Eurocypher ACM/Receiver Interface Message Definition, Version of 24. Published Oct. 1988.

Annex 1 To Proposal For New Part 6 Of The EBU Specification For The MAC/Packet Family, Version of 21, Published Oct. 1988.

Annex 2 To Proposal For New Part 6 Of The EBU Specification For The MAC/Packet Family, Version of 4, Published Oct. 1988.

Annex 3 To Proposal For New Part 6 Of The EBU Specification For The MAC/Packet Family, Version of 24, Published Oct. 1988.

"HDTV To Alter Cable Security Technology" Published Sep. 25, 1989 by Multichannel News.

F. Coutrot, "A Conditional Access System for Broadband Networks: Satellite–CATV, Terrestrial TV, Pay TV", presented at First World Electronics Media Symposium on Oct. 4–7, 1989, proceedings published by International Telecommunications Union, Geneva Switzerland.

United States Advanced Television Systems Committee Report, "Multiplexed Analog Component Televsion Broadcast System Parameter Specifications", Published Apr. 18, 1987.

Smart Card Conditional Access Microcomputers Memories, Motorola, undated.

Proposal to ANSI X3B10, Identification Cards—Integrated Circuit(s) Cards with Contacts, Sep. 8, 1988, ISO/IEC/DIS 7816–3.

Explanatory Report, ISO/IEC/DIS 7816–3 (N416), Jul. 1, 1988.

Identification cards—Part 1: Physical characteristics, ISO 7816–1, 1st Ed., Jul. 1, 1987.

Identification cards—Part 2: Dimensions and location of the contacts, ISO 7816–2, 1st Ed. May 15, 1988.

* cited by examiner

EXTERNAL SECURITY MODULE FOR A TELEVISION SIGNAL DECODER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to the field of scrambling systems and more specifically, to an external security module for a television signal decoder of a broadcast, satellite, or cable television transmission system. The present invention has particular application for B-type Multiplexed Analog Component (B-MAC) satellite transmission, but may also be used for NTSC (National Television Standards Committee), PAL, SECAM, or proposed high definition television formats. In addition, the scrambling system of the present invention can be used in applications in related fields such as electronic banking networks, telephone switching systems, cellular telephone networks, computer networks, etc. The system has particular application to so-called "conditional-access" multichannel television systems, where the viewer may have access to several "basic" channels, one or more "premium" or extra-cost channels as well as "pay-per-view" programs.

2. Description of the Relevant Art

In a pay television system, a pay television service provider typically protects the signal from unauthorized subscribers and pirates through scrambling.

For the purposes of the following discussion and this invention, the term "subscriber" means one who is paying for the television service. The "subscriber" could thus be an individual consumer with a decoder in his own home, or could be a system operator such as a local cable TV operator, or a small network operator such as a Hotel/Motel operator with a central decoder for all televisions in the Hotel or Motel. In addition, the "subscriber" could be an industrial user, as described in U.S. Pat. No. 4,866,770 assigned to the same assignee as the present application and incorporated herein by reference.

For the purposes of this invention, a network is defined as a program source, (such as a pay television provider), an encoder, (sometimes called a "head end"), a transmission means (satellite, cable, radio wave, etc.) and a series of decoders used by the subscribers as described above. A system is defined as a program source, an encoder, a transmission means, and a single receiving decoder. The system model is used to describe how an individual decoder in a network interacts with the encoder.

The scrambling process is accomplished via a key which may itself be encrypted. Each subscriber wishing to receive the signal is provided with a decoder having an identification number which is unique to the decoder. The decoder may be individually authorized with a key to descramble the scrambled signal, provided appropriate payments are made for service. Authorization is accomplished by distributing descrambling algorithms which work in combination with the key (and other information) to paying subscribers, and by denying that information to non-subscribers and to all would-be pirates.

The key may be transmitted as a data signal embedded in the normal television transmission associated with the identification number of the decoder. In a typical television signal, there are so-called "vertical blanking intervals" (VBI) occurring in each field and "horizontal blanking intervals" (HBI) occurring in each line between the chrominance and luminance signals. Various other signals can be sent "in-band" in the vertical and horizontal blanking intervals including additional audio channels, data, and teletext messages. The key can be embedded in these "blanking intervals" as is well known in the art. Attention is drawn to U.S. Pat. No. 4,829,569 assigned to the same assignee as the present application and incorporated herein by reference, showing how such data can be embedded in a B-MAC signal. Alternatively, the key may be sent "out-of-band" over a separate data channel or even over a telephone line.

Maintaining security in a conditional-access television network depends on the following requirements:

(i) The signal scrambling techniques must be sufficiently complex to insure that direct encryptographic attack is not practical.

(ii) keys distributed to an authorized decoder cannot be read out and transferred to other decoders.

The first condition can be satisfied by practical scrambling algorithms now available such as the DES (Data Encryption Standard) or related algorithmns.

The second condition requires the physical security of certain devices within the television signal decoder and is much more difficult to satisfy. Such a device must prevent observation of both the key decryption process and the partially decrypted key signals.

FIG. 1 shows a prior art conditional-access system for satellite transmission. In encoder 101, the source program information 102 which comprises video signals, audio signals, and data is scrambled in program scrambler 103 using a key from key memory 104. The scrambling techniques used may be any such techniques which are well known in the art. The key can be a signal or code number used in the scrambling process which is also required to "unlock" or descramble the program in program descrambler 108 in decoder 106. In practice, one key can be used (single layer encryption) or more than one key (not shown). The key is usually changed with time (i.e. - monthly) to discourage piracy. The scrambled programs and the key are transmitted through satellite link 105, and received by conditional-access decoder 106. Decoder 106 recovers the key from the received signal, stores it in key memory 107 and applies it to program descrambler 108 which descrambles the scrambled program received over satellite link 105, and outputs unscrambled program 109. The system is not totally secure, as the key is transmitted in the clear through the channel and is available for recovery by pirates.

To overcome this difficulty and referring to prior art FIG. 2, a method of protecting the key during distribution is introduced into the system of FIG. 1. Prior to transmission, the key used to scramble source program 202 in program scrambler 203 is recovered from key memory 204 and itself encrypted in key encryptor 210 using a secret serial number (SSN) from secret serial number database 211 which contains a list of the secret serial numbers of all legitimate subscribers. These secret serial numbers may relate to the unique identification numbers mentioned above for each decoder of a network of such decoders. The source program has now been scrambled using the key, and the key itself has been encrypted using a secret serial number. Thus, the key is not subject to compromise or recovery during transmission in comparison with the system of FIG. 1. In order to [scramble] *descramble* the program, the pirate must first obtain the secret serial number of a legitimate decoder, match it with the appropriately encrypted key, decrypt the key, and then descramble the program. The secret serial number is installed in decoder 206, for example, during manufacture in SSN memory 212 resident in decoder 206. The secret serial number is therefore unavailable to pirates provided that decoder 206 remains physically secure.

Each secret serial number is unique to an individual decoder or, at least, unique to a group of decoders in order to be reasonably secure. The encrypted key may therefore be transmitted to each decoder individually by cycling through a database 211, containing all the secret serial numbers of the network in encoder 201 and forming a separate key distribution message in an addressed data packet individually addressed to each authorized decoder in the network. An individual decoder recognizes when its encrypted key has been received by reading the key distribution message attached to the encrypted key.

In known B-MAC systems, the key is distributed in an addressed data packet individually addressed to a particular subscriber's decoder by means of its unique identification number. The addressed data packet is typically inserted in lines 4 through 8 of the vertical blanking interval. Each addressed data packet is typically addressed to one individual decoder. As there are sixty fields generated per second (30 frames of 2 interlaced fields each) in a B-MAC or NTSC television signal, at the rate of one addressed data packet per field, a possible sixty different decoders (or groups of decoders) can be addressed each second, or 3600 per minute, 215,000 per hour, and over 5 million per day. Since each decoder need only be addressed when the service level or encryption level changes, there are sufficient frames available to individually address each decoder even in large systems. The address rate of the decoders may be increased by transmitting more than one addressed data packet per field. Additional data packets may be inserted in the vertical blanking interval or in the horizontal blanking intervals of each frame. The total number of possible addressable decoders is a function of the number on data bits available for decoder addresses. The B-MAC format typically uses 28 bits for decoder addresses, allowing for over 268 million possible decoder addresses. Attention is drawn to the United States Advanced Television Systems Committee Report T2/62, "MULTIPLEXED ANALOG COMPONENT TELEVISION BROADCAST SYSTEM PARAMETER SPECIFICATIONS", incorporated herein by reference, which describes the data format in a B-MAC signal.

After receiving the addressed data packet, key decryptor 213 then decrypts the key using the secret serial number stored in SSN memory 212. If service to any decoder 206 in the network is to be terminated, the secret serial number for that decoder is simply deleted from SSN database 211, and decoder 206 is deauthorized at the beginning of the next key period.

In a decoder such as the one shown in FIG. 2, the pay television provider has to rely on the physical security of the decoder box itself to prevent a pirate from reading or modifying the secret serial number and key memories in the decoder or observing the key decryption process. In order to provide the necessary physical security, decoder boxes can be equipped with tamper-proof seals, specially headed screws and fasteners, or other tamper resistant packaging to make physical compromise of the decoder difficult. The subscriber is aware that tampering with the decoder could alter the tamper-proof seals or damage the decoder and subsequent examination could lead to discovery.

There are several disadvantages of relying on the physical security of the decoder to maintain system security. First, the pay television provider has to maintain ownership and control over all of the decoders of the network and then rent or lease the decoders to subscribers. The pay television provider is thus responsible for maintenance of all decoders and must maintain an expensive parts inventory and maintenance staff. In addition, in order to initiate service, a serviceperson must make a personal visit to the subscriber's location to install the decoder. In a pay television satellite system, such installation and service calls could be quite costly for remote installations which could be located anywhere in the world. Further, the physical security of a decoder could be breached without fear of discovery if a pirate could obtain a decoder that had been stolen either during the distribution process or from an individual subscriber's home.

Hence, the system of FIG. 2 can be secure only under the following conditions:

(i) It must be impossible to read or modify the SSN and key memories in the decoder.

(ii) It must be impossible to observe the key decryption process, or the links between the four elements (207, 208, 212, and 213) of the decoder.

One way to achieve both of these goals is by the use of a so-called "secure microprocessor".

FIG. 3 shows a block diagram of a typical prior art microprocessor 320 with processor 321, program memory 322, memory address bus 328, memory data 326 and memory data bus 327. In such a device, input data 323 is processed according to a program stored in program memory 322, producing output data 324. Program memory 322 can be "read out" through memory data bus 327. That is, the memory can be stepped through by sequentially incrementing memory address 325 through memory address bus 328 into program memory 322. Output memory data 326 from memory data bus 327 will reveal the entire program contents of microprocessor 320, including any stored descrambling algorithm and secret serial number. With such data, a pirate can easily decrypt a key transmitted through satellite link 205 of FIG. 2.

FIG. 4 shows a block diagram of an ideal secure microprocessor 420 adapted for securing an algorithm and secret serial number according to one aspect of the present invention. The major difference between secure microprocessor 420 of FIG. 4 and microprocessor 320 of FIG. 3 is that both memory address bus 328 and memory data bus 327 are absent, so there is no way to step through program memory 422 for the purpose of reading or writing. Memory references are executed only by processor 421 according to its mask-programmed code which cannot be changed. All input data 423 is treated as data for processing, and all output data 424 is the result of processing input data 423. There is no mechanism for reading or modifying the content of program memory 422 via the data inputs.

Modern devices are close approximation to this ideal secure microprocessor. There is, however, one requirement which causes a variation from the ideal. Following manufacture, there must be a mechanism available to write into memory 422 the decoder specific secret serial number 430, as well as decryption algorithm 434. If this facility were available to a pirate, he could modify the secret serial number for the purpose of cloning. Therefore, this facility must be permanently disabled after the secret serial number has been entered.

A variety of techniques may be used to disable the facility for writing into the memory. Secure microprocessor 420 could be provided with on-chip fusible data links 431, a software lock, or similar means for enabling the secret serial number 430 and descrambling algorithm 434 to be loaded into memory 422 at manufacture. Then, for example, the fusible links shown in dashed lines are destroyed so that a pirate has no access to descrambling algorithm 434 or secret serial number 430 stored in program memory 422.

In an alternative embodiment, the microprocessor of FIG. 4 can be secured with an "$E^2$ bit," The "$E^2$ bit", a form of software lock, will cause the entire memory (typically EEPROM) to be erased if an attempt is made to read out the contents of the memory. The "$E^2$ bit" provides two advantages; first, the memory is secured from would-be pirates, and second, the memory erasure will indicate that tampering has occurred.

A pirate would have to have access to extensive microchip facilities and a significant budget to compromise such a secure microprocessor. The physical security of the processor would have to be breached, destroying the processor and contents. However, integrated circuit technology continuously improves, and unexpected developments could occur which might enable attacks to be made at the microscopic level which are more economic than those available today. Further, the worldwide market for pirate decoders for satellite transmissions would provide the economic incentive to the increasingly sophisticated pirate electronics industry to compromise such a unit.

Copying a single decoder comprising a microprocessor according to FIG. 4 could lead to decoder clones based on the single secret serial number in that single decoder. Discovery would result in the termination of that secret serial number, and thus termination of all of the clones. However, a pirate would also have the option of using the single compromised unit to recover the key. The pirate could then develop a decoder design which would accept the key as a direct input. These pirate units could then be illegally distributed to subscribers, who would pay the pirate for a monthly update of the key. The consequence of a security breach could become extremely damaging to the pay television provider.

Pay television providers are therefore at risk if security depends exclusively on the physical defenses of the secure microprocessor. FIG. 5 shows a device which attempts to overcome the disadvantages of the devices of FIGS. 1 and 2 by providing a security device in a replaceable security module 514. Replaceable security module 514 comprises key decryptor 513, secret serial number memory 512 and key memory 507. As in FIG. 2, encoder 501 scrambles source program 502 comprising video signals, audio signals and data in program scrambler 503 using a key from key memory 504. The key is encrypted in key encryptor 510 using a secret serial number (SSN) from secret serial number database 511 which contains a list of the secret serial numbers of all legitimate subscribers.

The same SSN is installed in secret serial number memory 512 in replaceable security module 514 which is removably attachable to decoder 506. Key decryptor 513 of replaceable security module 514 decrypts the key using the secret serial number stored in secret serial number memory 512. The decrypted key is then stored in key memory 507. Unlike FIG. 2, the entire replaceable security module is removably attached to decoder 506. Program descrambler 508 reads the decrypted key from key memory 507 in replaceable security module 514 and uses the key to descramble and output descrambled program 509. Removable security module 514 is designed to be replaced by the subscriber, preferably without any special tools and, thus, most conventionally may comprise a plug-in module.

The use of a plug-in module gives the pay television provider the ability to upgrade the technology in the security device by swapping it out at very low cost. In the event of a security breach, a new replaceable security module containing the program scrambling algorithm and SSN could be mailed out to authorized subscribers. The authorized subscribers could then remove the old replaceable security module from their decoder and insert the new replaceable security module themselves. System security is thus recovered without the expense of replacing the entire decoder or the expense of sending a service person to replace the replaceable security modules in each decoder. In addition, it is not necessary for the pay television provider to own the decoder itself. The decoder can be a generic commercially available unit purchased by the subscriber, or even integrated into the television itself. To initiate service, the pay television provider need only mail the replaceable security module to the subscriber and no service call is necessary.

Although the replaceable security module has the advantages of providing a guarantee that network security is recoverable following a breach, it also has some disadvantages. All the security resides in replaceable security module 514, and decoder 506 itself is a generic unit. The key signal which is generated by replaceable security module 514 is observable at its transfer point to decoder 506. The key can, however, be changed sufficiently often to ensure that it has no value to a potential pirate.

The problem with this approach is that a given removable security module 514 will operate with any decoder 506, and that tampering with replaceable security module 514 does not involve damage to decoder 506. Consequently, if replaceable security module 514 were to be compromised, piracy would become widespread very rapidly.

Although the devices as described above show a single key to scramble the program signal (so-called "single layer encryption") any of the prior art devices could also be practiced using a multiple key ("two layer", "three layer", etc.) scrambling system. FIG. 6 shows an example of a prior art two layer encryption encoder 601. Encoder 601 contains secret serial number database 611 which contains a list of secret serial numbers for all authorized subscribers. Key memory 604 stores the "Key of the Month" (KOM) which in this embodiment can be either an "even" key for even months (February, April, June, etc.) or an "odd" key for odd months (January, March, May, etc.). The key could also be different for each month of the year, or could be made even more unique, depending on the available data bits for such a key. In addition, the key could be changed more frequently or less frequently than the monthly basis shown here.

Key encryptor 610 encrypts the key selected from key memory 604 and outputs a series of encrypted keys $E_{SSN}$ [KOM] each encrypted with a secret serial number from secret serial number database 611, to data multiplexor 635. Seed memory 636 contains a "seed" which is used for scrambling the audio and video signals. The "seed" can also be a data code or a signal similar to the key described above. Seed encryptor 637 encrypts the seed with the key of the month and outputs the encrypted seed $E_{KOM}$[SEED] to data multiplexor 635. Thus the key has been encrypted with the secret serial number, and the seed encrypted with the key. Neither the key nor the seed can be easily recovered during transmission.

In this embodiment, source program 602 comprises a Multiplexed Analog Video (MAC) signal 639 with the typical chrominance and luminance signals described previously, along with multiplexed audio data 638 which may comprise several different audio and non-audio (data) signals. For example, there may be at least two channels of audio (stereo) and additional channels of teletext for the hearing impaired. In addition, there may be additional channels of audio related to the video signal such as foreign language translations, unrelated audio signals such as radio programs or data signals such as subscriber messages, computer data, etc. All of these signals are digitized and multiplexed together, as is well known in the art, and the resulting multiplexed audio data 638 is then ready to be scrambled.

The seed passes through pseudo-random bit sequencer (PRBS) 643 and then is added to multiplexed audio data 638 in adder 644. Together, pseudo-random bit sequencer (PRBS) 643 and adder 644 comprise a bit-by-bit encryptor 645 as is well known in the art. The resulting scrambled multiplexed audio data is then passed to data multiplexor 635 and is multiplexed with the encrypted seed and key.

MAC video signal 639 is scrambled in line translation scrambler 603 which scrambles the lines of the MAC signal using the "seed" from seed memory 636 for the scrambling algorithm. The resulting scrambled MAC signal is then sent to multiplexor 632 which multiplexes the scrambled MAC signal with the output from data multiplexor 635. The multiplexed data output of data multiplexer 635 is modulated into pulse amplitude modulation (PAM) format by P.A.M. modulator 645. The output B-MAC signal 646 contains MAC video signal 639 and multiplexed PAM audio data 638, both scrambled with the seed, along with the seed encrypted with the key of the month, and a series of keys of the month which have been encrypted with the secret serial numbers of the subscriber's decoders, all multiplexed together.

In order to descramble the B-MAC signal 646, a pirate must be able to decrypt one of the encrypted keys, and use that key to decrypt the seed. However, as in the single layer encryption device described in FIG. 2, the pirate only needs to [comprise] *compromise* one of the transmission means coupled to said signal scrambling means and said second key encryptor means for transmitting said scrambled signal and said twice-encrypted key, decoders in order to obtain a secret serial number, and thus decrypt the key. With the key, a pirate can then decrypt the seed, and with the seed, descramble the program signal. Additional "layers" of encryption (i.e. more seeds and keys) make pirating more cumbersome, as the pirate must decrypt more seeds and keys, however, once the first key has been decrypted, the subsequent keys and seeds can be decrypted as well. In the embodiment shown in FIG. 6, keys need be decrypted every other month (even months and odd months) for the pirate to be able to descramble the program signal all year. The secret serial numbers, seed, and key, as used in FIG. 6, can be used effectively by the pay television provider to terminate a particular decoder by secret serial number and generally discourage piracy by amateurs. However, while this system has not yet been compromised, a determined pirate may compromise such a multi-layered encryption system with the aid of a compromised decoder, the heart of such piracy being the gaining of access to a secret serial number.

In view of the deficiencies of the above prior art devices, it still remains a requirement in the art to provide a scrambling system for pay television systems which does not rely solely on the physical security of the decoder components to maintain system integrity.

SUMMARY OF THE INVENTION

Therefore, it is an object of the present invention to provide a system of double-encrypting the key using two different secret serial numbers respectively assigned to a subscriber's decoder and removable security module.

It is a further object of the present invention to provide a replaceable security module for a television signal decoder where the replaceable security module will work with only one decoder and cannot be used with another decoder.

It is a further object of the present invention to provide a decoder with a data interface for a removable security module.

Many of the above-stated problems and related problems of the prior art encryption devices have been solved by the principles of the present invention which twice-encrypts the key prior to transmission, first with a first secret serial number [($SSN_1$)] ($SSN_0$) of the subscriber's [replaceable security module] *decoder*, and again with a second secret serial number [($SSN_0$)] ($SSN_1$) of the subscriber's [decoder] *replaceable security module*. The double-encryption technique discourages copying the replaceable security module, as each replaceable security module will work only with its mating decoder. The system also allows the replaceable security module to be replaced following a system breach, thus allowing for recovery of system security.

The system comprises an encoder for encoding a signal, for encoder further comprising a signal scrambler and a first and second key encrypters. The signal scrambler scrambles the signal and outputs a scrambled signal and a key for descrambling the scrambled signal. The first key encryptor is coupled to the signal scrambler and performs a first encryption on the key using a first secret serial number and outputs a once-encrypted key. The second key encryptor is coupled to the first key encryptor and performs a further encryption on the once-encrypted key using a second secret serial number and outputs a twice-encrypted key.

The system further comprises a transmitter coupled to the signal scrambler and the second key encryptor for transmitting the scrambled signal and twice-encrypted key.

The system further comprises a decoder coupled to the transmitter for receiving and descrambling the scrambled signal. The decoder comprises first and second key decryptors and a descrambler. The first key decryptor is coupled to the transmitter and performs a first key decryption on the twice-encrypted key using the second secret serial number and outputs a partially decrypted key. The second key decryptor is coupled to the first key decryptor and perform a second key decryption on the partially decrypted key using the first secret serial number and outputs the decrypted key. The descrambler is coupled to the second key decryptor and the transmitter and descrambles the scrambled signal using the decrypted key and outputs the descrambled signal.

In an alternative embodiment of the present invention, the decoder may function without the use of a replaceable security module. In the event of a system breach or a service level change, a replaceable security module may then be inserted into the decoder to "upgrade" the decoder.

These and other objects and advantages of the invention, as well as the details of an illustrative embodiment, will be more fully understood from the following specification and drawings in which similar elements in different figures are assigned the same last two digits to their reference numeral (i.e., encoder 701 of FIG. 7 and encoder 801 of FIG. 8).

DETAILED DESCRIPTION OF THE PREFERRED EMBODIMENT

Figure 5:
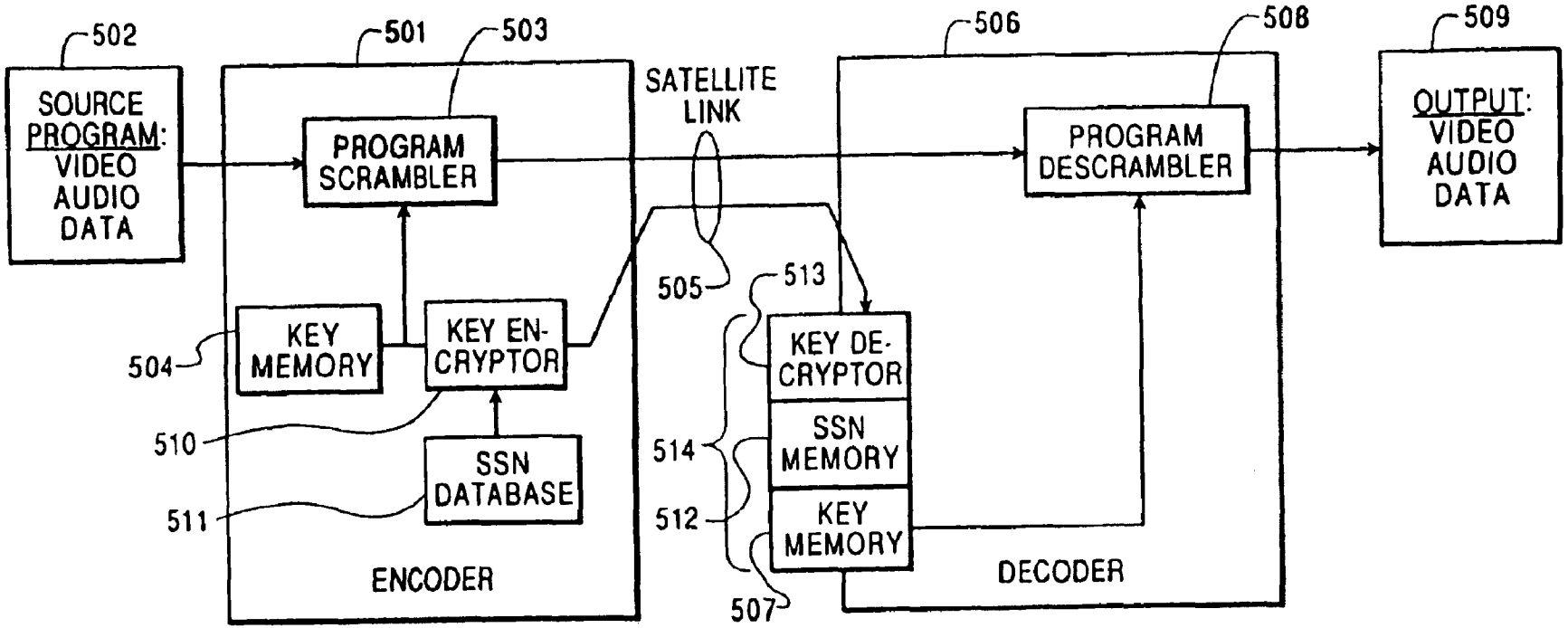
FIG. 5 shows an example of a conditional-access system for satellite transmission with a replaceable security module containing a first secret serial number.
Figure 6:
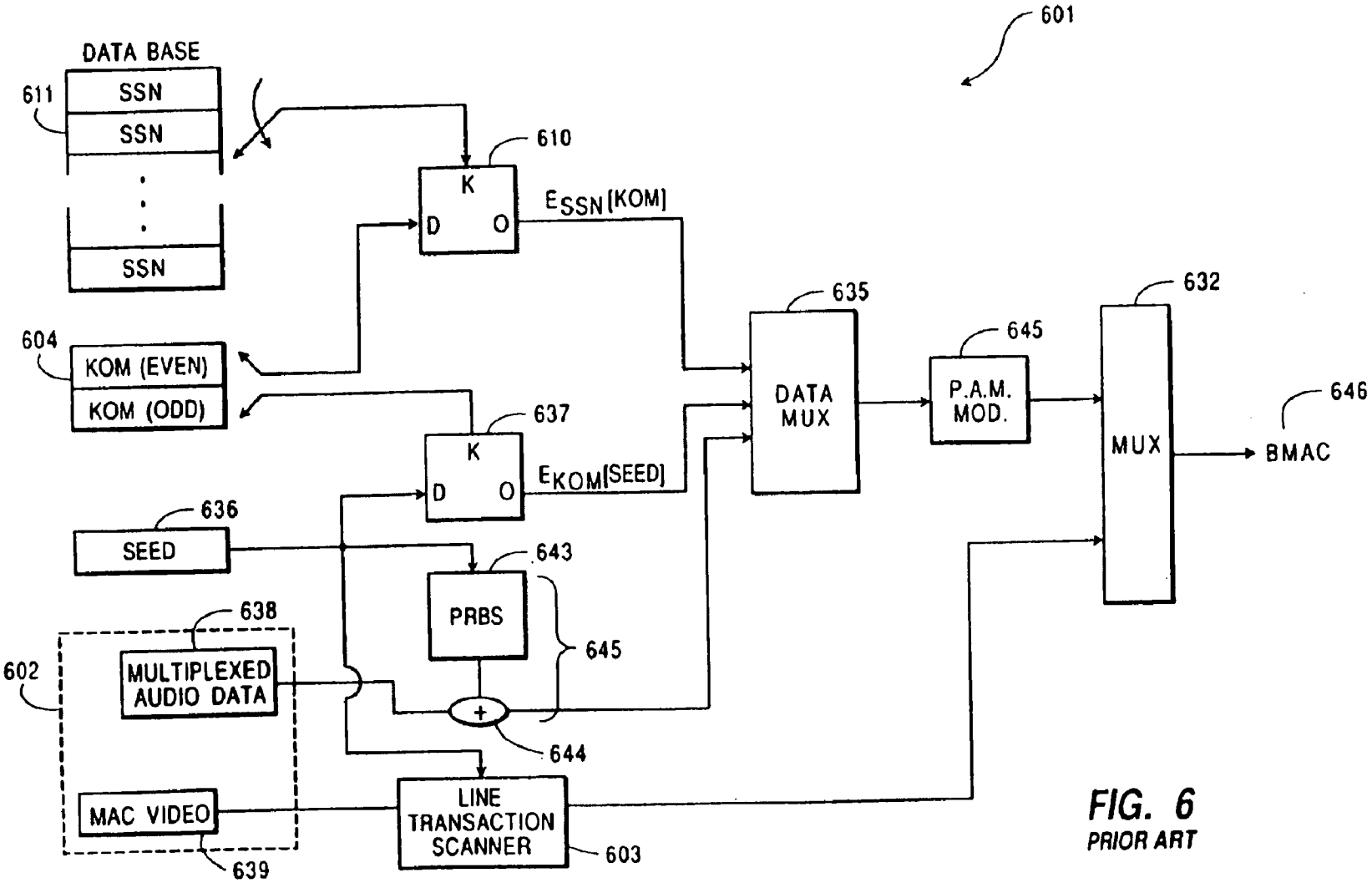
FIG. 6 PRIOR ART
FIG. 6 shows another prior art conditional-access system for satellite transmission using an additional layer of encryption.
Figure 7:
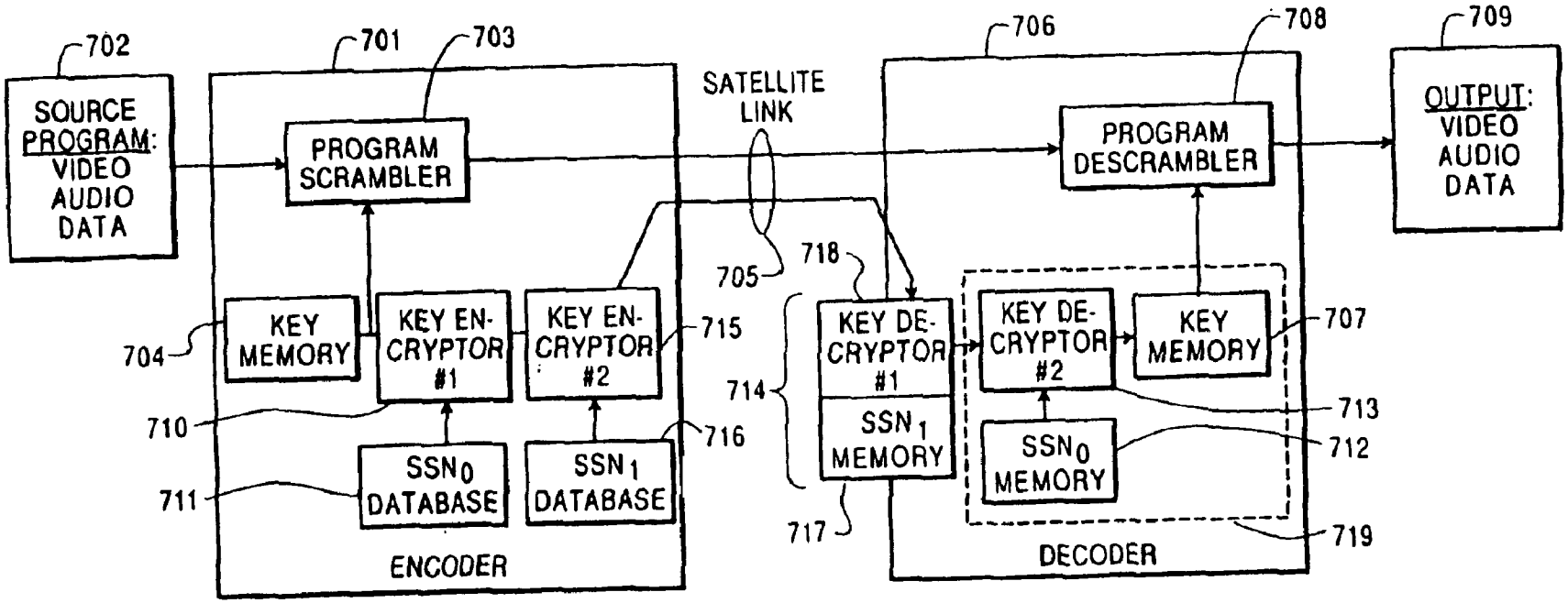
FIG. 7 shows one exemplary embodiment of the conditional-access system of the present invention with an encoder encrypting the key with both a first and second secret serial number, a satellite transmission system, and a decoder containing a first secret serial number and a replaceable security module containing a second secret serial number.

FIG. 7 shows the encryption system of the present invention comprising an encoder 701 for encoding a source program 702 for transmission over a satellite link 705 to a decoder 706. According to FIG. 7, the key is encrypted and addressed to individual decoders, similar to the device in FIG. 5. However, in this case, the key is encrypted not once, but twice and must also be decrypted twice in the decoder. The first decryption takes place in a replaceable security module 714 which is mounted on the exterior of the decoder 706, for example, as a plug-in module. The second decryption takes place in a fixed security element 719 which is an integral part of the decoder 706. Both decryptions must take place properly for the decoder to receive the key.

The encoder 701 has a key memory 704 containing the key used to scramble program 702 in program scrambler 703. The key is first encrypted in first key encryptor 710 with a first secret serial number ($SSN_0$) stored in $SSN_0$ database 711. The key is further encrypted in second key encryptor 715 with a second secret serial number ($SSN_1$) from $SSN_1$ database 716. This produces a series of twice-encrypted keys which are then transmitted along with the scrambled program via satellite link 705. The decoder 706 receives the [encrypted] *scrambled* program and one of the twice-encrypted keys and performs a first key decryption in replaceable security module 714. The replaceable security module 714 contains a second secret serial number ($SSN_1$), which could be assigned to a particular security module or series of modules, in $SSN_1$ memory 717. The replaceable security module 714 performs a first key decryption in first key decryptor 718 and outputs a partially decrypted key. The partially decrypted key, still unreadable to a pirate, is sent to second key decryptor 713 located in decoder 706 itself. There, the key is fully decrypted using the first secret serial number stored in $SSN_0$ memory 712. The fully decrypted key is now stored in key memory 707 and used to descramble the scrambled program received from satellite link 705 in program descrambler 708 and output descrambled program 709.

Figure 1:
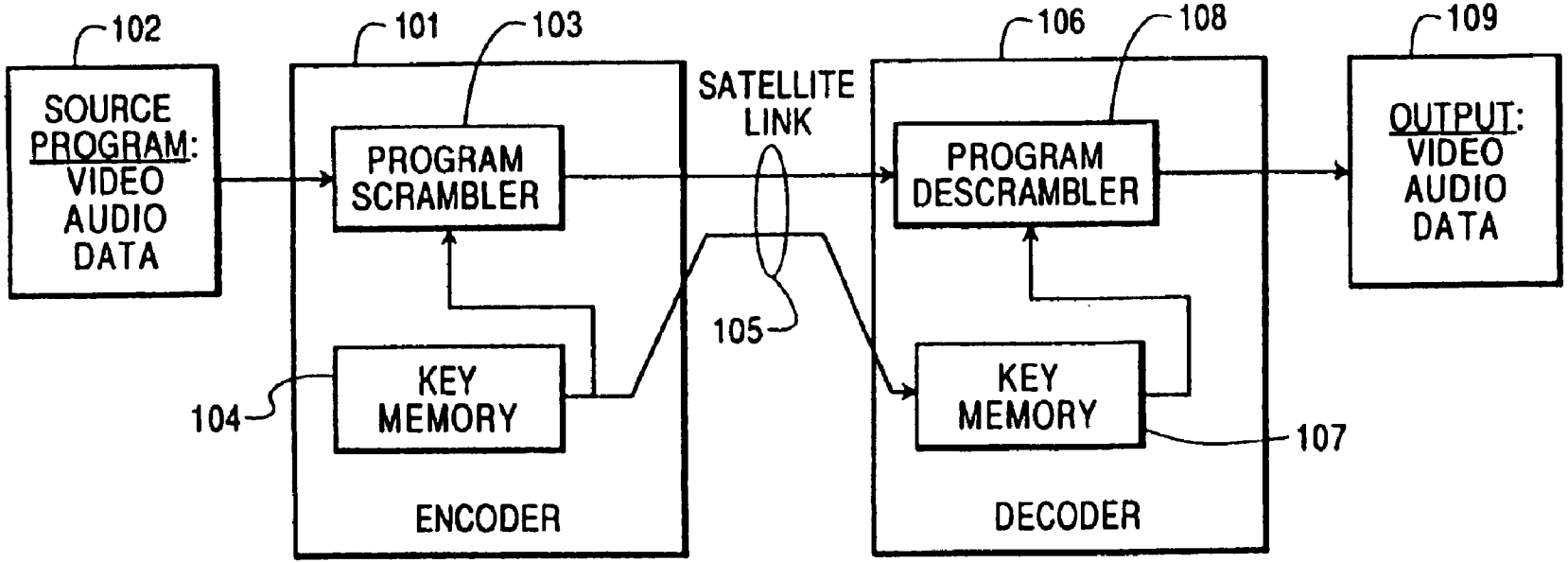
FIG. 1 PRIOR ART
FIG. 1 shows an example of a prior art conditional-access system for satellite transmission with a key signal sent in the clear to the decoder.
Figure 2:
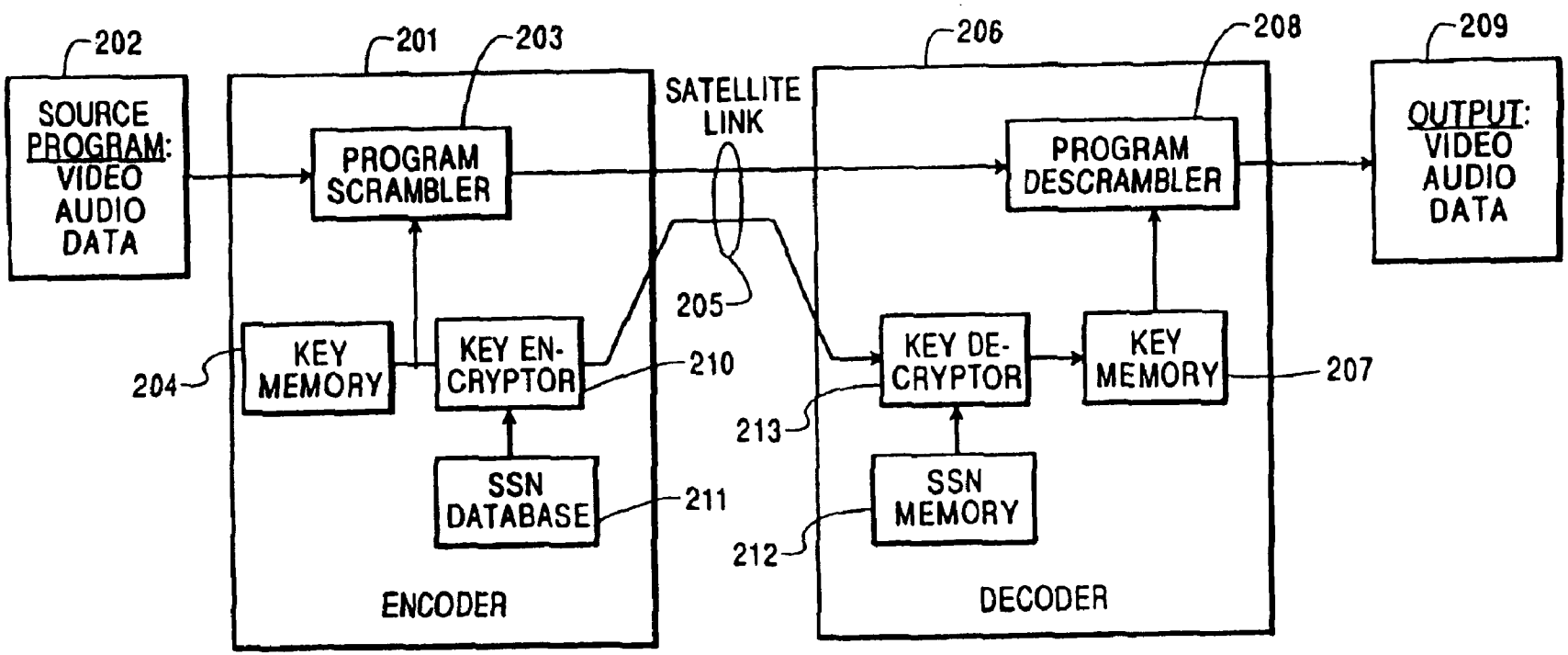
FIG. 2 PRIOR ART
FIG. 2 shows an example of a prior art conditional-access system for satellite transmission using a single key encryption technique.
Figure 3:
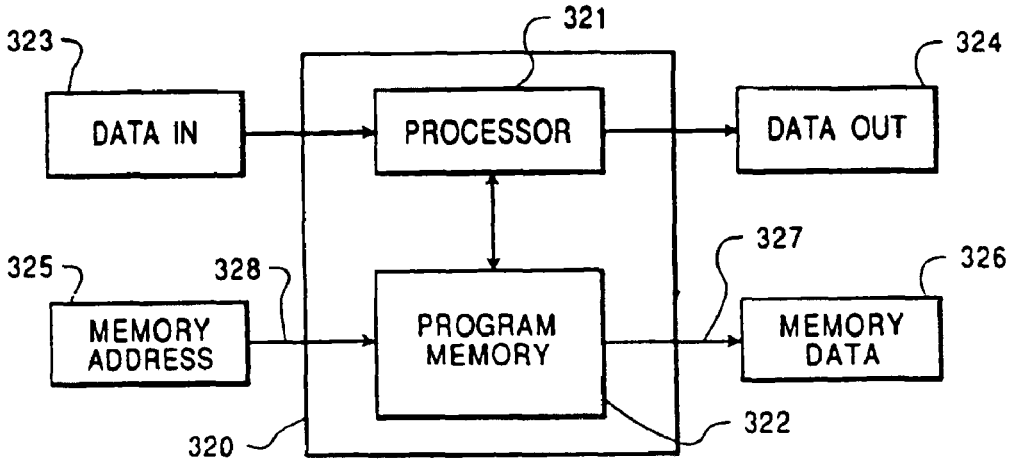
FIG. 3 PRIOR ART
FIG. 3 shows an example of a prior art microprocessor without a secure memory.
Figure 4:
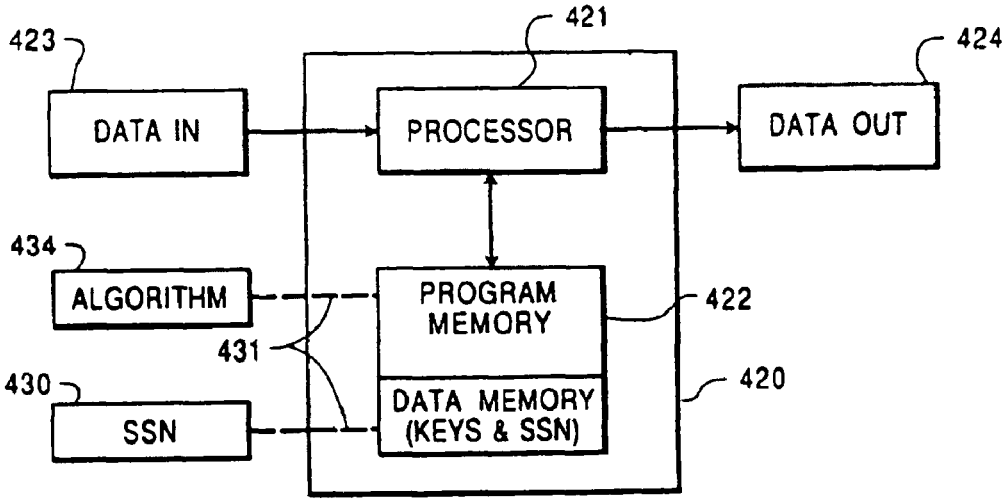
FIG. 4 shows a secure microprocessor with a secure memory and fusible data links adapted for storing an algorithm and secret serial number according to the present invention.

Both replaceable security module 714 and an internal security element 719 of decoder 706 may be constructed according to the principles of FIG. 4. For example, the second secret serial number $SSN_1$ may be loaded into $SSN_1$ memory 717 of Module 714 and fusible links used for loading the memory destroyed during manufacture. Similarly, $SSN_0$ memory 712 of internal security element 719 may be loaded during manufacture over a fusible link and the link destroyed. Also over a fusible link, algorithms may be loaded into key decryptors 718, 713 during manufacture and the fusible links subsequently destroyed.

The effect of twice-encrypting the key is to ensure that replaceable security module 714 must correspond to a particular decoder 706 and will not operate with any other decoder. Loss of replaceable security module 714 during distribution no longer presents a potential security breach. To compromise the system, it is now necessary to break the physical security of both replaceable security module 714 and internal security element 719. In order to fully compromise the system, the internal security element 719 must be attacked, restoring the risk to the subscriber that his decoder will be damaged.

At the same time, the replaceable security module provides the pay television provider with the option of replacing system security by mailing out new replaceable security modules to all authorized subscribers. Returned replaceable security modules 714 could be re-used for a different subscriber decoder by reprogramming the $SSN_0$ and $SSN_1$ databases 711 and 716 to correspond to the combination of the first secret serial number of decoder 706 with the second secret serial number of security module 714. Alternatively, the returned replaceable security modules 714 could be destroyed, and a new replaceable security module 714 sent out, incorporating changes and improvements in the security technology to thwart potential pirates. In the event of a security breach, it is only necessary to replace the replaceable security module and not the complete decoder in order to restore system security.

Alternatively, the decoder 706 may function optionally without the use of the replaceable security module 717. In such a system, encoder 701 may be programmed to perform single level key encryption by encrypting the key from key memory 704 once in second key encryptor 715, bypassing first key encryptor 710. Decoder 706 would sense the absence of removable security module 717 and perform only a single key decryption in second key decryptor 713.

If a system breach occurs, the pay television provider then mails out replaceable security modules to subscribers, uses the double encryption technique, and thus recovers system security. The optional usage of the replaceable security module has other attractive benefits as well. Subscribers who do not pay for any premium channels may not be sent a replaceable security module, as the "basic" channels may only use a once-encrypted key or may even be sent in the clear. If the subscriber wishes to upgrade to a premium channel of channels, the pay television provider may then mail that subscriber the appropriate replaceable security module.

In addition, the replaceable security module may be used to add other additional features. Many cable television systems offer optional services such as IPPV (Impulse-Pay-Per-View) which require two-way communication between the decoder 706 and the head end. In the past, if a subscriber wished to upgrade to IPPV service, a subscriber's decoder would have to be altered by inserting a IPPV module internally or by adding an IPPV "side car" externally. Alternatively, the entire decoder would have to be replaced. All three options would necessitate a service call, causing inconvenience to the subscriber, and expense to the pay television provider. Similarly, when a pay television provider wishes to upgrade its entire encoder/decoder system, it must provide a new decoder to each subscriber which will work in the interim with both the old and new encoding techniques, as it is nearly impossible to replace all subscriber decoders simultaneously. Then a decoder manufacturer is faced with the added expense of providing his state-of-the-art decoder with extra circuitry in order to function with the pay television provider's old encoder for the few months during the change over period.

In both the above instances, the replaceable security module 714 may be used to upgrade the decoder 706 without the expense and inconvenience of a service call. The replaceable security module 714 may be mailed to the subscriber and the subscriber can then insert the replaceable security module 714 and instantly upgrade the decoder and add additional features (such as IPPV), alter the encoding technique, or providing an external level of security.

The replaceable security module 714 may take one of several forms. In the preferred embodiment, the module may comprise a "smart card", a plastic "credit card" with a built-in micro-processor, such as described by the International Standards Organization in standard ISO 7816/1 and ISO7816/2. Attention is drawn on U.S. Pat. No. 4,841,133 issued Jun. 20, 1989 and incorporated herein by reference, describing such a "smart card." The "smart card" may be equipped with a series of electrical contacts which connect to contacts in the decoder 706. The contacts may provide power to the card, along with clock signals and data transmission.

Figure 8:
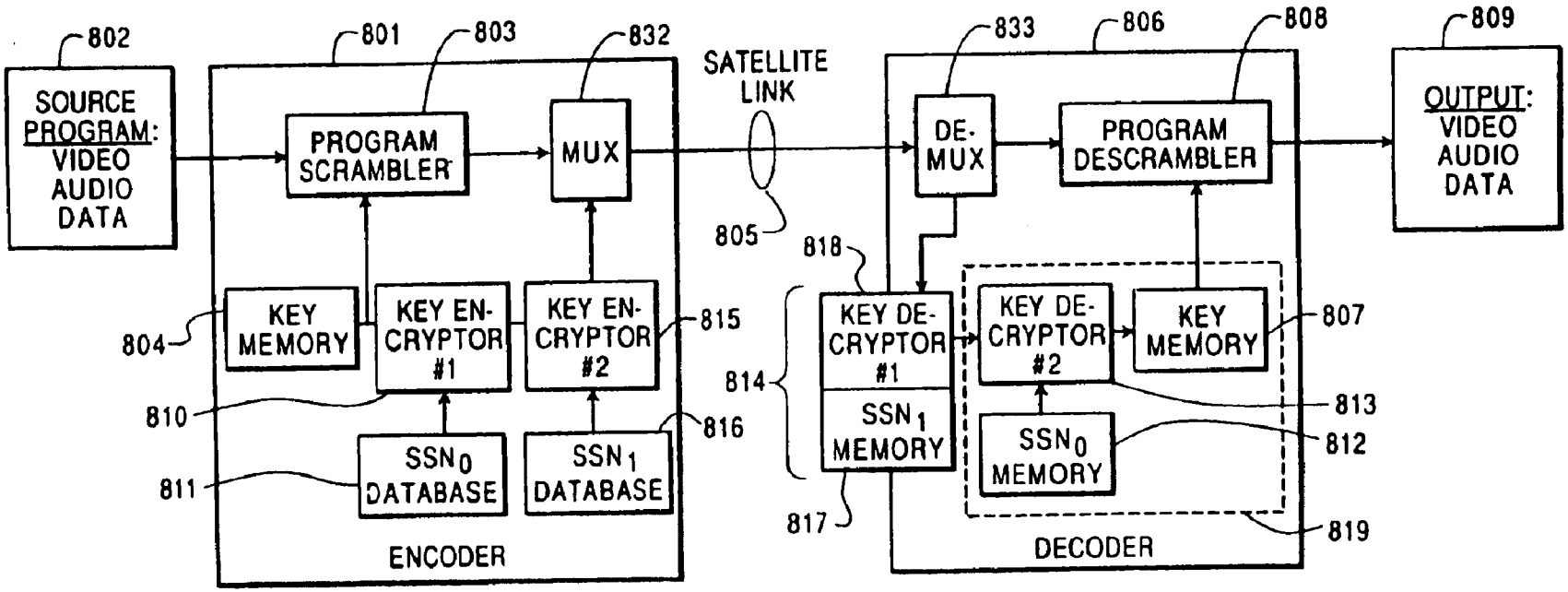
FIG. 8 shown another embodiment of the encryption system of the present invention including a multiplexor and demultiplexor for multiplexing the twice encrypted key with the scrambled program signal prior to transmission, and demultiplexing the twice encrypted key from the scrambled program signal after reception.

FIG. 8 shows another embodiment of the present invention wherein the key is twice encrypted and addressed to individual decoders, similar to the device in FIG. 7. The encoder 801 has a key memory 804 containing the key used to scramble program 802 in program scrambler 803. The key is first encrypted in first key encryptor 810 with the first secret serial number ($SSN_0$) stored in $SSN_0$ database 811. The key is further encrypted in second key encryptor 815 with a second secret serial number ($SSN_1$) from $SSN_1$ database 816, producing a series of twice-encrypted keys as in FIG. 7. However, in this embodiment, the twice encrypted keys are then multiplexed into the scrambled program in multiplexor 832 and transmitted via satellite link 805.

The decoder 806 receives the encrypted program and demultiplexes the twice encrypted keys from the scrambled program signal in demultiplexor 833. The decoder 806 then chooses the proper twice encrypted key based on the key message associated with the proper key for that decoder, and performs a first key decryption in replaceable security module 814. The partially decrypted key is then sent to second key decryptor 813 located in the decoder 806 itself. There, the key is fully decrypted using the unique first secret serial number stored in $SSN_0$ memory 812. The fully decrypted key is now stored in key memory 807 and used to decrypt the program in the program descrambler 808 and output the decrypted program 809. The second key decryptor 813, key memory 807, and $SSN_0$ memory 812 together comprise fixed internal security element 819.

Figure 9:
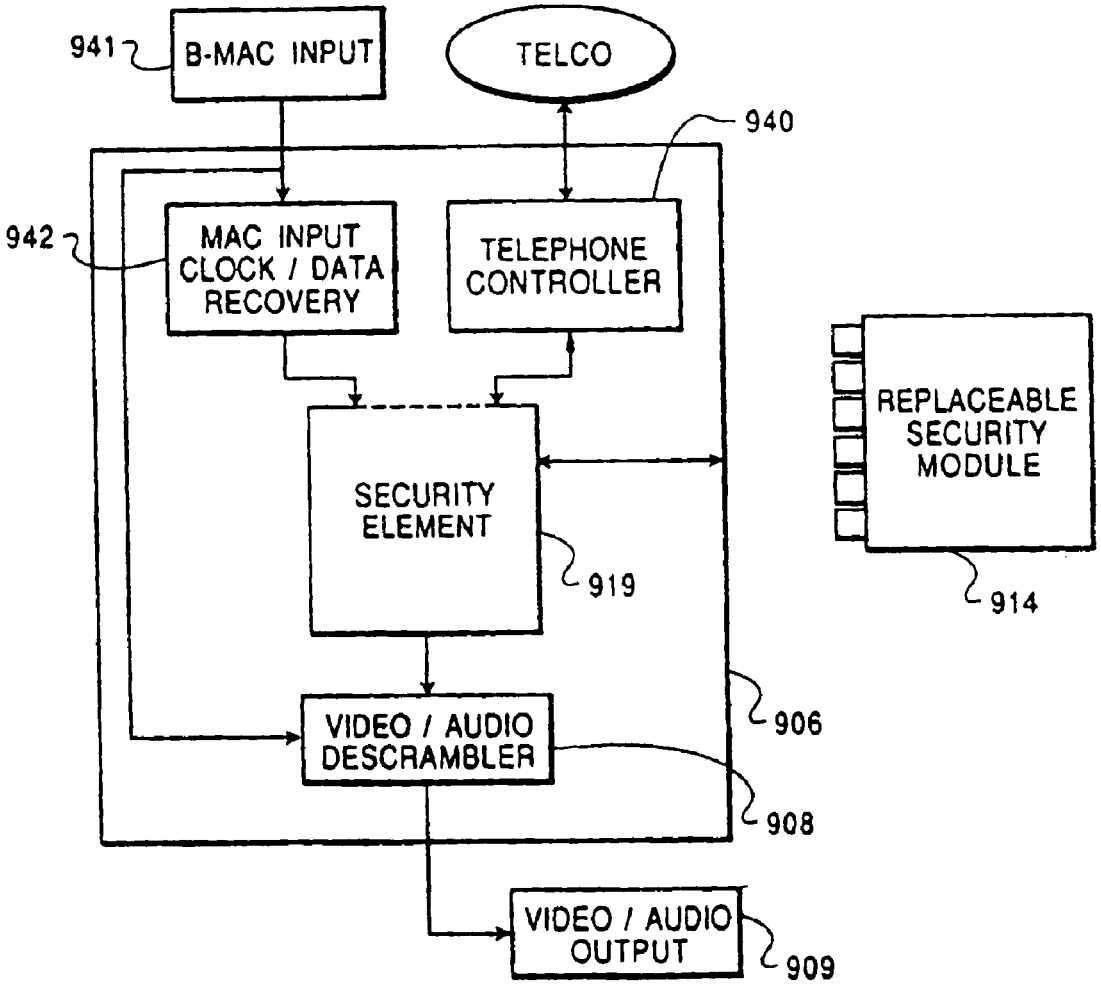
FIG. 9 shows an alternative embodiment of the device of FIG. 7 incorporating a telephone controller for bi-directional telephone control for pay-per-view access or key transmission.

FIG. 9 shows an alternate embodiment of the present invention with a telephone controller. Decoder 906 is similar to the decoder 706 of FIG. 7, except that decoder 906 of FIG. 9 also includes a telephone controller 940 for receiving or sending an encrypted key or other data. Telephone controller 940 adds an additional level of security to the system, as the key does not have to be transmitted with the program signal over a separate channel as in FIG. 7 or multiplexed into the signal as in FIG. 8. In addition, the telephone controller 940 can provide two-way communication with the program source for such features as pay-per-view (PPV) or impulse pay-per-view (IPPV) programming.

Pay-per-view programming is defined here as any programming where the subscriber can request authorization to watch a particular program. In many pay television systems, pay-per-view programming is used for sporting events (boxing, wrestling, etc.) which are not transmitted on a regular basis. A subscriber wishing to view the event must receive authorization in the form of a special descrambler mechanism, or in the form of a special code transmitted or input to the subscriber's decoder. Some pay-per-view television systems allow the subscriber to request a pay-per-view program (i.e. - movies) to watch. The pay television provider then transmits the requested program and authorizes that subscriber's decoder to receive the signal.

Impulse pay-per-view (IPPV) programming is defined here as any programming where the subscriber has a pre-authorized number of "credits" saved in his individual decoder. If a subscriber wishes to view a particular program, the subscriber merely actuates the decoder, the appropriate number of credits are subtracted from the subscriber's remaining credits, and the subscriber is immediately able to view the program.

In a pay-per-view embodiment of the present invention, the decoder may send a signal to the head end via the telephone controller 940 with a request for authorization to decode a pay-per-view program. Alternately, the decoder 906 may store authorization information (i.e. -credits) for pay-per-view programming, and forward actual pay-per-view data via the telephone controller 940 at a later time.

The telephone controller 940 could be a computer modem type device, or could work using touch-tone signals to communicate with the head end. Preferably, the telephone controller is a modem type device, communicating with the head end using a TSK protocol. Attention is drawn to copending application Ser. No. 187,978 filed Apr. 29, 1989 describing TSK operation and incorporated herein by reference. The pay television provider can thus send appropriate authorization information (TEL) to the subscriber, encrypted with the subscriber's secret telephone number (STN). The secret telephone number is not a telephone number in the ordinary sense, but rather another type of secret serial number, which could be assigned to a given telephone controller 940 or series of telephone controllers. Once received by the decoder 906, the authorization information may be used to enable descrambling of a particular pay-per-view program or programs.

In another embodiment, which could be used in conjunction with the pay-per-view embodiment described above, the telephone controller can be used to receive the key encrypted with the secret telephone number. The scrambled program signal 941 is input to the decoder 906 which provides the input signal 941 to a clock/data recovery unit 942 and the video/audio descrambler 908. The clock/data recovery unit 942 provides sync and data for the program signal fed to the fixed security element 919. Fixed security element 919 contains a key decryptor, key memory and $SSN_0$ memory. The telephone controller 940 receives the key, encrypted with the secret telephone number of the decoder (STN) stored in the replaceable security module 914. The telephone controller 940 typically commences communication and can be programmed to call the head end at a predetermined time or at a predetermined time interval, or upon receiving a signal from the head end preferably when phone usage is at a minimum (i.e. - early morning hours). The telephone controller can call the head end via a toll free 1-800 number, a so-called "watts" line, or via a local call to a commercial data link such as TYMNET of TELENET. Once the call is connected and communications established, the decoder 906 uploads to the head end a record of pay-per-view usage encrypted with the secret telephone $STN_1$. The head end may then download data similarly encrypted to the decoder 906 including new keys, secret serial numbers, or decryption algorithms. The encrypted key may be sent to the fixed security element 919, which has removably attached thereto the replaceable security module 914. The key is then decrypted in the replaceable security module using the secret telephone number, and decoder control information is sent to the program descrambler 908 to produce the descrambled program 909.

As discussed above, a new secret serial number or decryption algorithm, encrypted with the secret telephone number, may be sent from the head end to a decoder through telephone controller 940. The encrypted secret serial number of decryption algorithm is then decrypted and stored in the replaceable security module. The downloading of decryption algorithms and secret serial numbers via the telephone controller 940 is sometimes called an "$E^2$ patch", and allows the pay television provider to maintain or recover system security by loading new information into a decoder's EEPROM. An $E^2$ patch does not necessarily entail changing the entire decryption algorithm in the decoder 906. The secret serial number or merely a portion of the decryption algorithm, such as a particular byte or data table need only be changed in order to sufficiently alter the decryption algorithm. The $E^2$ patch allows the pay television provider or upgrade the encryption system to fix "bugs" and recover system security.

After receiving a signal through the telephone controller 940, the head end will send an acknowledment signal to the decoder, indicating that information has been received. Similarly, after data has been downloaded from the head end to the decoder through the telephone controller, the decoder will return an acknowledgement signal to the head end that data has been received.

In addition to pay-per-view requests or records, telephone controller 940 can also be used to upload other signals from the decoder. For example, tamper protection information such as described in connection with FIG. 4 can be sent indicating whether or not the decoder has been tampered with. Further, program viewing information can be uploaded to the pay television provider for television rating purposes (i.e., - Nielson ratings)

In general, any data that can be delivered via the B-MAC input 941 of FIG. 9 (or NTSC, PAL, SECAM, etc.) can also be downloaded through the telephone controller 940. Such information includes, but is not limited to, blackout codes, tiering information, personal messages number of available credits, group identification numbers, and other system data. Generally, the telephone controller 940 is used for infrequent communications, such as periodic security level changes and IPPV requests, due to the limited bandwidth of telephone lines and the increased cost of sending information via telephone versus the B-MAC input.

The telephone information (TEL) encrypted with the secret telephone number (STN) remains encrypted throughout the decoder 906 and may only be decrypted in the replaceable security module 914. The decrypted telephone information does not pass out of the replaceable security module 914, in order to prevent observation by a pirate. In order for the decoder 906 to descramble a scrambled program, both the telephone information and the addressed data packet received through the B-MAC input 941 must be present. By relying on both information sources, piracy is virtually impossible, as the potential pirate must break into the pay television provider's telephone system as well as decrypt the twice-encrypted key.

Figure 10:
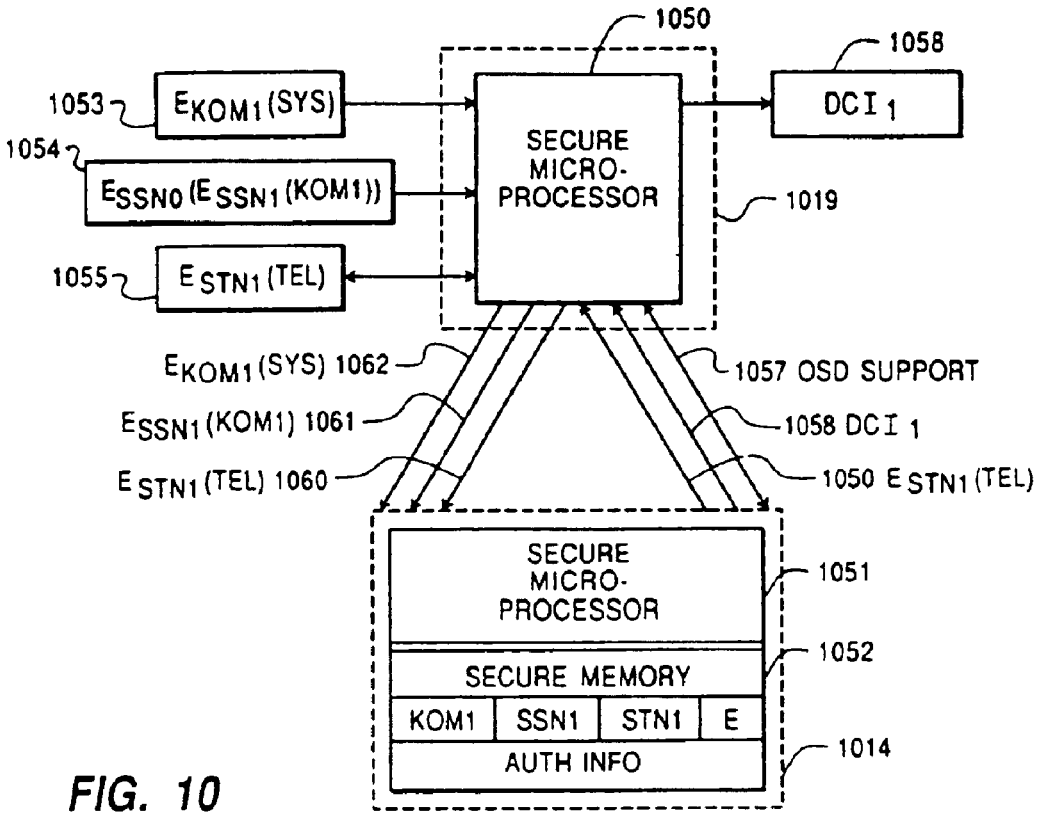
FIG. 10 shows a block diagram of an alternative embodiment of the device of FIG. 9, showing in detail how signals are passed between the decoder and the replaceable security module.

FIG. 10 shows a more detailed diagram of the device of FIG. 9, showing how the various signals are sent between the fixed security element 1019 and the replaceable security module 1014. In this embodiment, both the fixed and replaceable security modules 1019 and 1014 are built around secure microprocessors 1050 and 1051 similar to that shown in FIG. 4. In FIG. 10, the subscript "0" is used to denote signals and keys stored or decrypted in the fixed security element 1019, while the subscript "1" denotes signals and keys stored or decrypted in the replaceable security module 1014.

Fixed security element 1019 comprises a secure microprocessor 1050 which receives signals 1053, 1054, and 1055 as inputs. Signal 1053 is the program (SYS) which has been scrambled with a key-of-the-month (KOM) and is represented by the symbol $E_{KOM1}$(SYS). Signal 1054 is the key-of-the-month (KOM) which has been twice-encrypted with the two secret serial numbers ($SSN_0$ and $SSN_1$) of the fixed and replaceable security modules 1019 and 1014, respectively and is represented by the symbol $E_{SSN0}(E_{SSN1}$(KOM1)).

Signal 1055 is an additional signal, $E_{STN1}$(TEL), which is the telephone data encrypted with a secret telephone number (STN) described in FIG. 9 above. The telephone data can be used to provide an additional level of security, as well as to allow the subscriber to request "pay-per-view" programs via the phone line as described in FIG. 9 above.

Secure microprocessor 1050 performs a first decryption of twice-encrypted key 1054 using the first secret serial number $SSN_0$ stored within secure microprocessor 1050. Secure microprocessor 1050 passes partially decrypted key-of-the-month $E_{SSN1}$(KOM) 1061 to replaceable security module 1014 along with scrambled program $E_{KOM1}$(SYS) 1062 and encrypted telephone data $E_{STN1}$(TEL) 1060.

Replaceable security module 1014 comprises secure microprocessor 1051 which has secure memory 1052 where the second secret serial number $SSN_1$ is stored along with the secret telephone number $STN_1$, the encryption algorithm E, and other authorization information. Secure microprocessor 1051 performs a further decryption on partially decrypted key-of-the-month $E_{SSN1}$(KOM) 1061 received from fixed security element 1019, using the second secret serial number $SSN_1$ and encryption algorithm E stored within secure memory 1052. The decrypted key-of-the-month (KOM1) is stored in the secure memory 1052 of secure microprocessor 1051. As discussed in FIG. 4, secure memory 1052 cannot be directly addressed or read out, and as such the second secret serial number $SSN_1$ and the encryption algorithm E cannot be observed by a potential pirate.

Secure microprocessor 1051 also decrypts the telephone data (TEL) using the secret telephone number $STN_1$ stored within the secure memory 1052 of the secure microprocessor 1051. If the key-of-the-month (KOM1) can be decrypted, and authorization is present (for pay-per-view), or unnecessary (for other channels), then scrambled program $E_{KOM1}$(SYS) 1062 can be descrambled in replaceable security module 1014, producing decoder control information $DCI_1$ 1058. Decoder control information $DCI_1$ 1058 typically contains the line translation scrambling information for the video signal, and decryption information for the multiplexed audio data along with other information such as whether teletext is enabled and which audio channel is to be selected. The program control information $DCI_1$ 1058 and the encrypted telephone data $E_{STN1}$(TEL) are sent to the fixed security element 1019. If authorization is present (for IPPV) or unnecessary (for other channels), the secure microprocessor 1050 outputs the program control data 1058 to the rest of the decoder (not shown) for program descrambling. On-screen display support information (OSD) 1057 is decoded from the encrypted program signal [$EKOM_1$(SYS)] $E_{KOM1}$(*SYS*) and provides information how on-screen display is controlled by fixed security element 1019 to display personal messages, control a barker channel, indicate the number of remaining credits, indicate authorized channels as well as other ways of controlling displayed information.

Figure 11:
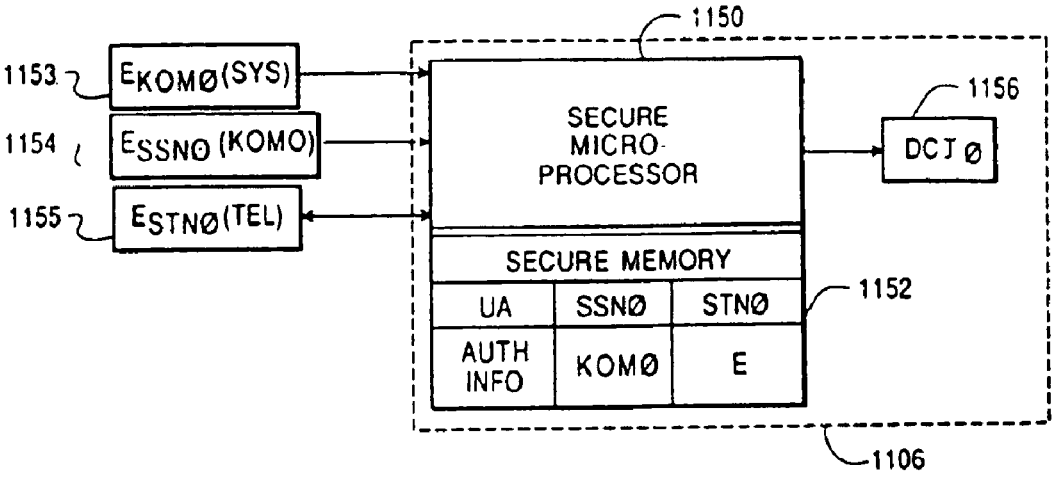
FIG. 11 shows another embodiment of the device of FIG. 10 with the telephone controller, but without a replaceable security module.

FIG. 11 shows a further embodiment of the present invention, without replaceable security module. In this embodiment, the subscript "0" has been used to denote that all decryptions take place within secure microprocessor 1150. Decoder 1106 comprises secure microprocessor 1150 with secure memory 1152. Secure memory 1152 contains a secret serial number $SSN_0$ and a secret telephone number $STN_0$ unique to that decoder or a series of decoders loaded during manufacture and secured with an "$E^2$ bit" as discussed in connection with FIG. 4. Scrambled program $E_{KOM0}$(SYS) 1153 and once-encrypted key-of-the-month $E_{SSN0}$(KOM0) 1154 are input to decoder 1106 along with encrypted telephone data $E_{STN0}$(TEL) 1155.

Secure microprocessor 1150 decrypts encrypted telephone data $E_{STN0}$(TEL) 1155 using the secret telephone number $STN_0$ stored in secure memory 1152. The decrypted telephone data (TEL) is also stored in secure memory 1152 to prevent observation by pirates. The telephone data (TEL) may provide authorization information to decode 1106 as to whether decoder 1106 is presently authorized to decrypt some or all of the received scrambled programs. In addition, other information may be transferred between the decoder and the head end as discussed in connection with FIG. 9.

If authorization is present, secure microprocessor 1150 uses the first secret serial number $SSN_0$ stored in secure memory 1152 to decrypt the key $KOM_0$. As in FIG. 10, the secure microprocessor 1150 then outputs program control information $DCI_0$ 1156 to the remainder of decoder 1106 in order to descramble the program signal.

While the present invention has been disclosed with respect to a preferred embodiment and modifications thereto, further modifications will be apparent to those of ordinary skill in the art within the scope of the claims that follow. It is not intended that the invention be limited by the disclosure, but instead that its scope be determined entirely by reference to the claims which follow herein below.

What is claimed is:

1. A security system for transmission of a signal comprising:

encoder means for encoding said signal, said encoder means comprising:

signal scrambling means for scrambling signal and outputting a scrambled signal and a key for descrambling said scrambled signal;

first key encryptor means coupled to said signal scrambling means, for performing a first encryption on said key using a first confidential serial number and outputting a once-encrypted key, and second key encryptor means coupled to said first key encryptor means, for performing a further encryption on said [once] *once*-encrypted key using a second confidential serial number and outputting a twice-encrypted key,

*transmission means coupled to said signal scrambling means and said second key encrypted means for transmitting said scrambled signal and said twice-encrypted key,* decoder means coupled to said transmission means for receiving and descrambling said scrambled signal, said decoder means comprising:

first key decryptor means coupled to said transmission means, for performing a first key decryption on said [twice] *twice*-encrypted key using said second confidential serial number and outputting a partially decrypted key, a replaceable security module, removably attached to said decoder means and containing a second key decryptor means coupled to said first key decryptor means, for performing a second key decryption on said partially decrypted key using [a] *said* first confidential serial number and outputting a decrypted key, and signal descrambling means coupled to said second key decryptor means and said transmission means for descrambling said scrambled signal using said [twice-decrypted] *decrypted* key and outputting a descrambled signal.

2. The security system of claim 1, wherein said encoder means further comprises:

key memory means coupled to said signal scrambling means and said first key encryptor means for storing said key.

3. The security system of claim 1, wherein said encoder means further comprises:

a first confidential serial number database coupled to said first key encryptor means, containing a list of first confidential serial numbers.

4. The security system of claim 3, wherein said encoder means further comprises:

a second confidential serial number database coupled to said second key encryptor means, containing a list of second confidential serial numbers.

5. The security system of claim 1, wherein said decoder means further comprises:

second confidential serial number memory means coupled to said first key decryptor means, for storing [a] *said* second confidential serial number.

6. The security system of claim 5, wherein said replaceable security module contains [said] first confidential serial number memory means.

7. A security system for transmission of a signal comprising:

encoder means for encoding said signal, said encoder means comprising:

signal scrambling means for scrambling *said* signal and outputting a scrambled signal and a key for descrambling said scrambled signal, first key encryptor means coupled to said signal scrambling means, for performing a first encryption on said key using a first confidential serial number and outputting a once-encrypted key, and second key encryptor means coupled to said first key encryptor means, for performing a further encryption on said [once] *once*-encrypted key using a second confidential serial number and outputting a twice-encrypted key,

*transmission means coupled to said signal scrambling means and said second key encryptor means for transmitting said scrambled signal and said twice-encrypted key,* decoder means coupled to said transmission means for receiving and descrambling said scrambled signal, said decoder means comprising:

a replaceable security module, removably attached to said decoder means and containing a first key decryptor means coupled to said transmission means, for performing a first key decryption on said [twice] *twice*-encrypted key using said second confidential serial number and outputting a partially decrypted key, a second key decryptor means coupled to said first key decryptor means, for performing a second key decryption on said partially decrypted key using [a] *said* first confidential serial number and outputting a decrypted key, and signal descrambling means coupled to said [first] second key decryptor means and said transmission means for descrambling said scrambled signal using said [twice-decrypted] *decrypted* key and outputting a descrambled signal.

8. The security system of claim 7, wherein said decoder means further comprises:

first confidential serial number memory means coupled to said second key decryptor means for storing [a] *said* first confidential serial number.

9. The security system of claim 1, wherein said decoder means further comprises:

telephone interface means for transmitting and receiving data to and from a pay television provider, said data encrypted with a confidential telephone number.

10. The security system of claim 9, wherein an encrypted key is received via said telephone interface means.

11. The security system of claim 1, wherein said transmission means further comprises:

first transmission means for transmitting said scrambled signal; and second transmission means for transmitting said twice-encrypted key.

12. The security system of claim 1, wherein said signal is a television signal.

13. The security system of claim [11] *12*, wherein said television signal is a B-MAC type television signal.

14. The security system of claim 1, wherein said encoder means further comprises:

multiplexor means for multiplexing said twice-encrypted key with said scrambled signal prior to transmission.

15. The security system of claim 14, wherein said decoder further comprises:

demultiplexor means for demultiplexing said twice-encrypted key from said scrambled signal.

16. A decoder for receiving and descrambling a signal which has been scrambled using a key which has been subsequently twice-encrypted, said decoder comprising:

first key decryptor means for performing a first key decryption on said [twice] *twice*-encrypted key using [said] *a* second confidential serial number and outputting a partially decrypted key, a replaceable security module, removably attached to said decoder and containing a second key decryptor means coupled to said first key decryptor means for performing a second key decryption on said partially decrypted key using a first confidential serial number and outputting a decrypted key, and signal descrambling means coupled to said second key decryptor means for descrambling said scrambled signal using said [twice-decrypted] *decrypted* key and outputting a descrambled signal.

17. The decoder of claim 16, further comprising:

key memory means coupled to said signal [descrambler] *descrambling* means and said second key decryptor means for storing said decrypted key.

18. The decoder of claim 16, further comprising:

second confidential serial number memory means coupled to said first key decryptor means, for storing [a] *said* second confidential serial number.

19. A decoder for receiving and descrambling a signal which has been scrambled using a key which has been subsequently twice-encrypted, said decoder comprising:

a replaceable security module, removably attached to said decoder and containing a first key decryptor means for performing a first key decryption on said [twice] *twice*-encrypted key using [said] *a* second confidential serial number and outputting a partially decrypted key, second key decryptor means coupled to said first key decryptor means for performing a second key decryption on said partially decrypted key using a first confidential serial number and outputting a decrypted key, and signal descrambling means coupled to said second key decryptor means for descrambling said scrambled signal using said [twice-decrypted] *decrypted* key and outputting a descrambled signal.

20. The decoder of claim 16, further comprising:

first confidential serial number memory means coupled to said second key decryptor means, for storing [a] *said* first confidential serial number.

21. The decoder of claim 20, wherein said replaceable security module contains *said* first confidential serial number memory means.

22. The decoder of claim 16, wherein said signal is a television signal.

23. The decoder of claim 16 further comprising:

telephone interface means for transmitting and receiving data to and from a pay television provider, said data encrypted with a confidential telephone number.

24. The decoder of claim 23, wherein said twice-encrypted key is received via said telephone interface means.

25. The decoder of claim 22, wherein said television signal is a B-MAC type television signal.

26. The decoder of claim 16, wherein said scrambled signal and said twice-encrypted key have been multiplexed together prior to reception by the decoder.

27. The decoder of claim [24] *26*, further comprising: demultiplexor means for demultiplexing said twice-encrypted key from said scrambled signal.

28. A method of transmitting a secure signal comprising the steps of:

scrambling said signal using a key to produce a scrambled signal, encrypting said key using a first confidential serial number to produce a once-encrypted [key.] *key,* further encrypting said [once] *once*-encrypted key using a second confidential serial number to produce a twice-encrypted key, transmitting said scrambled signal and said twice-encrypted key, receiving said scrambled signal and said twice-encrypted key in a decoder, performing a first decryption of said twice-encrypted key using said second confidential serial number to produce a partially decrypted key, performing a second decryption on said partially decrypted key in a replaceable security module removably attached to said decoder using [a] *said* first confidential serial number to produce a decrypted key, descrambling said scrambled signal using said decrypted key to produce a descrambled signal, and outputting said descrambled signal.

29. The method of claim 28, wherein said second confidential serial number is assigned to said decoder.

30. A method of transmitting a secure signal comprising the steps of:

scrambling said signal using a key to produce a scrambled signal, encrypting said key using a first confidential serial number to produce a once-encrypted key, further encrypting said [once] *once*-encrypted key using a second confidential serial number to produce a twice-encrypted key, transmitting said scrambled signal and said twice-encrypted key, receiving said scrambled signal and said twice-encrypted key in a decoder, performing a first decryption of said twice-encrypted key in a replaceable security module removably attached to said decoder using said second confidential serial number to produce a partially decrypted key, performing a second decryption on said partially decrypted key using [a] *said* first confidential serial number to produce a decrypted key, descrambling said scrambled signal using said decrypted key to produce a descrambled signal, and outputting said descrambled signal.

31. The method of claim 30, wherein said second confidential [security] *serial* number is assigned to said replaceable security module.

32. The method of claim 28, wherein said first confidential [security] *serial* number is assigned to said replaceable security module.

33. The method of claim 28, wherein said transmitting step further comprises:

multiplexing said scrambled signal and *said* twice-encrypted key together prior to transmission.

34. The method of claim 28, wherein said transmitting step further comprises:

transmitting said [scrambling] *scrambled* signal and said twice-encrypted key as separate signals.

35. A method of decoding a signal comprising the steps of:

receiving a scrambled signal and a twice-encrypted key in a decoder, performing a first decryption of said twice-encrypted key using a second confidential serial number to produce a partially decrypted key, performing a second decryption on said partially decrypted key in a replaceable security module removably attached to said decoder using a first confidential serial number to produce a decrypted key, descrambling said scrambled signal using said decrypted key to produce a descrambled signal, and outputting said descrambled signal.

36. A method of decoding a signal comprising the steps of:

receiving a scrambled signal and a twice-encrypted key in a decoder, performing a first decryption of said twice-encrypted key in a replaceable security module removably attached to said securing using a second confidential serial number to produce a partially decrypted key, performing a second decryption on said partially decrypted key using a first confidential serial number to produce a decrypted key, descrambling said scrambled signal using said decrypted key to produce a descrambled signal, and outputting said descrambled signal.

37. The method of claim 36, wherein said first confidential serial number is assigned to said decoder.

38. The method of claim 36, wherein said second confidential serial number is assigned to said replaceable security module.

39. The method of claim 35, wherein said second confidential serial number is assigned to said decoder.

40. The method of claim 35, wherein said first confidential serial number is assigned to said replaceable security module.

41. A decoder for receiving and descrambling a signal scrambled using a twice-encrypted key, said decoder comprising:

connector means for connecting said decoder to a replaceable security module, through which connector means said twice-encrypted key is transmitted to said replaceable security module and a partially-decrypted key is received from said replaceable security module, key decryptor means, coupled to said connector means for performing a decryption on said partially-decrypted key using a second confidential serial number, and outputting a decrypted key, and signal descrambling means coupled to said key decryptor for descrambling said signal with said decrypted key and outputting a descrambled signal.

42. The decoder of claim 41, further comprising:

key memory means coupled to said signal descrambling means and said key decryptor means for storing said decrypted key.

43. The decoder of claim 41, wherein said signal is a television signal.

44. The decoder of claim [41] *43*, wherein said television signal is a B-MAC type television signal.

45. The decoder of claim 41, wherein said scrambled signal and said twice-encrypted key [signal] have been multiplexed together prior to reception by the decoder.

46. The decoder of claim 45, further comprising:

demultiplexor means for demultiplexing said twice-encrypted key [signal] from said scrambled signal.

47. The decoder of claim 41, further comprising:

telephone interface means for transmitting and receiving data to and from a pay television provider, said data encrypted with a confidential telephone number.

48. The decoder of claim 47, wherein said twice-encrypted key is received via said telephone interface means.

49. A decoder for receiving and descrambling a signal scrambled using a twice-encrypted key, said decoder comprising:

key decryptor means, for performing a first key decryption on said twice-encrypted key using a first confidential serial number and outputting a partially decrypted key, connector means, coupled to said key decryptor means for connecting said decoder to a replaceable security module, through which connector means said partially decrypted key is transmitted to said replaceable security module and a descrambling control signal is received from said replaceable security module, signal descrambling means, coupled to said connector means and receiving said descrambling control signal for descrambling said signal and outputting a descrambled signal.

50. The decoder of claim 49, wherein said signal is a television signal.

51. The decoder of claim [49] *50*, wherein said television signal is a B-MAC type television signal.

52. The decoder of claim 49, wherein said scrambled signal and said twice-encrypted key [signal] have been multiplexed together prior to reception by the decoder.

53. The decoder of claim 52, further comprising:

demultiplexor means for demultiplexing said twice-encrypted key [signal] from said scrambled signal.

54. The decoder of claim 49 further comprising:

telephone interface means for transmitting and receiving data to and from a pay television provider, said data encrypted with a confidential telephone number.

55. The decoder of claim 54, wherein said twice-encrypted key is received via said telephone interface means.

56. A replaceable security module for storing confidential serial number and performing a partial decryption of a twice-encrypted key and outputting a partially decrypted key, said replaceable security module [comprising;] *comprising:* connector means for connecting said replaceable security module to a decoder and through which [a] *said* twice-encrypted key is received from said [encoder] *decoder* and a partially decrypted key is transmitted to said decoder, memory means for storing at least [a] *said* confidential serial number, and decryption means, coupled to said connector means and said memory means for performing a partial decryption on said twice-encrypted key and outputting [a] *said* partially-decrypted key.

57. The replaceable security module of claim 56, wherein said memory means further comprises:

security means for allowing the contents of said memory means to be read only by said decryption means.

58. A replaceable security module for storing a secret serial number and performing a decryption of a partially decrypted key and outputting a descrambling control signal, said replaceable security module [comprising;] *comprising:* connector means for connecting said replaceable security module to a decoder and through which [a] *said* partially decrypted key is received from said [encoder] *decoder* and *said* descrambling control signal is transmitted to said decoder, memory means for storing at least [a] *said* secret serial number, and decryption means, coupled to said connector means and said memory means for performing a decryption on said partially decrypted key and outputting a descrambling control signal.

59. The replaceable security module of claim 58, wherein said memory means further comprises:

security means for allowing the contents of said memory means to be read only by said decryption means.

* * * * *